(12) United States Patent
Wilhelm et al.

(10) Patent No.: US 8,419,127 B1
(45) Date of Patent: Apr. 16, 2013

(54) MOVEABLE SEATBELT SUPPORT (75) Inventors: Terry Wilhelm, Gilbert, AZ (US); D. Brent Noel, Queen Creek, AZ (US); Douglas Richard Clark, Chandler, AZ (US); Loren K. Aragon, Maricopa, AZ (US)

(73) Assignee: Armorworks Enterprises LLC., Chandler, AZ (US)

( * ) Notice: Subject to any disclaimer, the term of this patent is extended or adjusted under 35 U.S.C. 154(b) by 143 days.

(21) Appl. No.: 12/965,021

(22) Filed: Dec. 10, 2010

Related U.S. Application Data (60) Provisional application No. 61/284,043, filed on Dec. 11, 2009.

(51) Int. Cl.
*B60N 2/42* (2006.01)
*B60N 2/427* (2006.01)
*B60R 21/00* (2006.01)
*B60R 22/00* (2006.01)

(52) U.S. Cl.
USPC .................. 297/216.13; 297/484; 280/808

(58) Field of Classification Search ............. 297/216.13, 297/484; 280/808
See application file for complete search history.

(56) References Cited

U.S. PATENT DOCUMENTS

| | | | | |
|---|---|---|---|---|
| 2,195,334 A * | 3/1940 | Lethern | ......................... | 297/484 |
| 2,394,523 A * | 2/1946 | Pancoe | ..................... | 297/484 X |
| 2,403,653 A * | 7/1946 | Geohegan et al. | ........ | 297/484 X |
| 3,639,000 A * | 2/1972 | Keltner | ...................... | 297/484 X |
| 4,652,053 A * | 3/1987 | Mikami | ........................ | 297/484 |
| 5,468,053 A * | 11/1995 | Thompson et al. | .. | 297/216.13 X |
| 5,641,198 A * | 6/1997 | Steffens, Jr. | ............. | 297/216.13 |
| 5,645,316 A * | 7/1997 | Aufrere et al. | ........... | 297/216.13 |
| 5,697,670 A * | 12/1997 | Husted et al. | ............ | 297/216.13 |
| 5,823,619 A * | 10/1998 | Heilig et al. | ......... | 297/216.13 X |
| 5,823,627 A * | 10/1998 | Viano et al. | .......... | 297/216.13 X |
| 6,045,186 A * | 4/2000 | Butt et al. | ............ | 297/216.13 X |
| 6,145,881 A * | 11/2000 | Miller et al. | .................. | 280/806 |
| 6,250,680 B1 | 6/2001 | Moker | | |
| 6,276,721 B1 * | 8/2001 | Romeo | ......................... | 280/808 |
| 6,336,664 B1 * | 1/2002 | Roder | .......................... | 280/806 |
| 6,446,910 B1 | 9/2002 | Knoll | | |
| 6,666,520 B2 | 12/2003 | Murphy | | |
| 6,913,314 B2 | 7/2005 | Hansen | | |
| 7,011,338 B2 | 3/2006 | Midorikawa | | |
| 7,614,124 B2 | 11/2009 | Keene | | |
| 7,618,097 B2 | 11/2009 | Ghatge | | |
| 7,722,081 B2 | 5/2010 | Van Druff | | |
| 7,735,934 B2 | 6/2010 | Fuhrken | | |

* cited by examiner

*Primary Examiner* — Rodney B White
(74) *Attorney, Agent, or Firm* — James L. Farmer (57) ABSTRACT

Methods and apparatus are provided for a crew seat for use in vehicles and aircraft potentially exposed to high acceleration or sudden impact conditions. The crew seat comprises a seat back with a rigid frame, a belt restraint system including a shoulder belt attached to an anchor point behind the seat back, and a shoulder belt support extending from the seat back. The shoulder belt support comprises an elongated portion disposed between a fixed end attached to the seat back and a free end with a guide slot. The shoulder belt support is moveable between a raised orientation and a lowered orientation by varying tension in the shoulder belt.

11 Claims, 6 Drawing Sheets

MOVEABLE SEATBELT SUPPORT

TECHNICAL FIELD

The present invention generally relates to vehicle restraint systems, and more particularly relates to belt restraint systems used in vehicles and aircraft potentially exposed to collisions and other high accelerations events.

BACKGROUND

Crew seats used in certain military and emergency vehicles and aircraft are designed with the intent to prevent injury to the occupant from impulse loads associated with crashes and other unexpected high acceleration events. For example, so-called variable-displacement seats incorporate mechanisms to attenuate the lethal energy pulse levels that may result from an under-vehicle mine blast or an aircraft hard landing. In such ultra-high acceleration events it is crucial that the occupant stay positively restrained in the seat at all times to prevent rebound injuries. Accordingly, such seats typically utilize multi-point belt restraint systems, minimally including two lap belts and two shoulder belts that connect to a centrally located buckle or latch.

However, crew members utilizing military and emergency vehicles that incorporate such seats often wear various forms of emergency and tactical gear. Examples include fire resistant jackets, breathing equipment, and ballistic armor vests. Gear of this type can be quite bulky and restrictive to movement, in some cases interfering with a crew member's ability to perform necessary and routine tasks such as attaching a belt restraint system. In particular, the shoulder straps of a multi-point restraint system typically extend from behind the seat through a guide located at or near the top of the seat back. Once a crew member is seated, the shoulder straps can become trapped between the occupant's back and the seat, or in some cases can slip around the side of the seat and behind the seat back. In either situation, it can be difficult or impossible for a seated occupant wearing restrictive gear to reach and then don the shoulder belts without assistance from another crew member. In addition, the confined seating quarters typical of vehicles and aircraft that utilize crew seats with multi-point belt restraint systems make performing such tasks even more difficult.

Accordingly, a need exists for a belt restraint system suitable for use on a crew seat of a vehicle or aircraft exposed to high acceleration conditions that can accommodate the use of bulky and restrictive equipment worn by a crew member. A further need exists for such a belt restraint system that can be readily reached and attached by a seated crew member without assistance.

SUMMARY

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment." do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a crew seat for use in vehicles and aircraft potentially exposed to high acceleration or sudden impact conditions. The crew seat comprises a seat back with a rigid frame, a belt restraint system including a shoulder belt attached to an anchor point behind the seat back, and a shoulder belt support extending from the seat back. The shoulder belt support comprises an elongated portion disposed between a fixed end attached to the seat back and a free end with a guide slot. The shoulder belt support is moveable between a raised orientation and a lowered orientation by varying tension in the shoulder belt.

According to another exemplary embodiment, the present disclosure provides a belt restraint system for use on a crew seat suitable for vehicles and aircraft. The belt restraint system includes a shoulder belt attached to an anchor point behind the crew seat, and a shoulder belt support extending from the crew seat. The shoulder belt support comprises a fixed end rigidly attached to the seat, a flexible elongated portion, and a free end with a guide slot. The shoulder belt support is bendable between a raised orientation and a lowered orientation by varying tension in the shoulder belt.

According to another exemplary embodiment, the present disclosure provides a support for a shoulder belt of a belt restraint system. The support comprises a fixed end adapted for attachment to a seat, an elongated portion extending from the fixed end of the support, and a free end with a belt guide slot for the shoulder belt to pass through the support. The support for a shoulder belt further comprises means for the support to move between raised and lowered orientations by varying tension on the shoulder belt.

Furthermore, other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

The present invention will hereinafter be described in conjunction with the following drawing figures, wherein like numerals denote like elements, and wherein.

DETAILED DESCRIPTION

The present invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
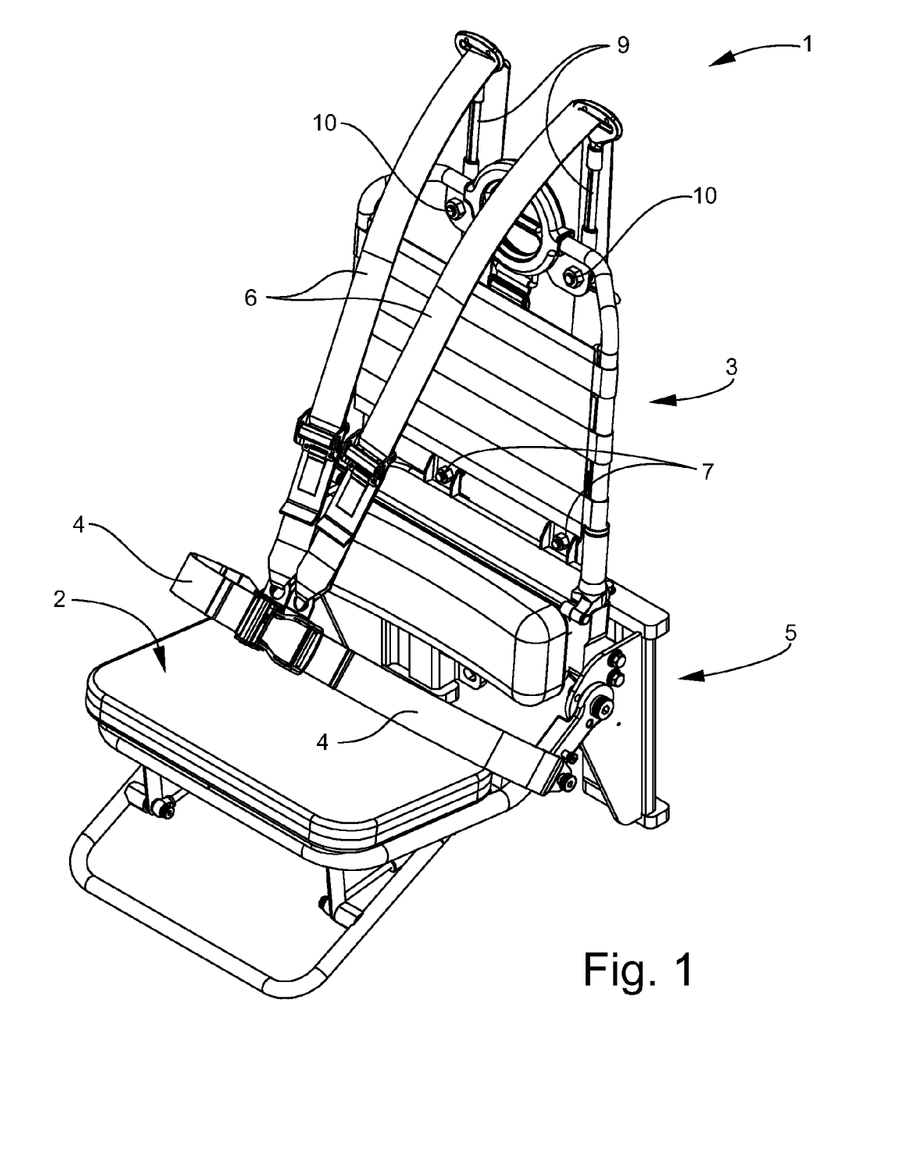
FIG. 1 is a front perspective view of a crew seat incorporating the shoulder belt support of the present invention.
Figure 2:
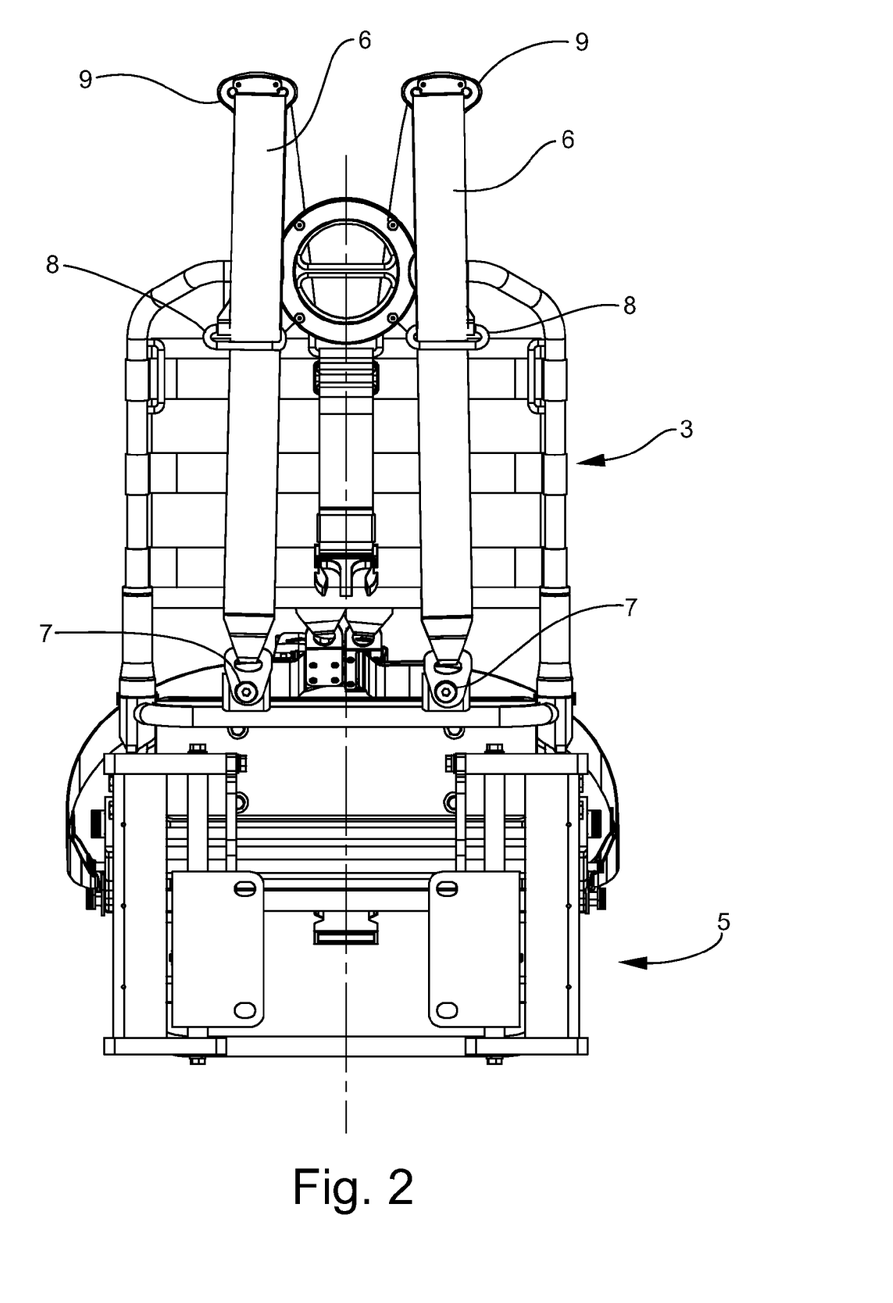
FIG. 2 is a back view of the crew seat shown in FIG. 1.

Referring to FIGS. 1 and 2, a seat belt support in accordance with the present invention is shown in conjunction with a vehicle seat 1 of a type suitable for use by crew members in vehicles and aircraft. The seat 1 is comprised generally of a seat portion 2, and a back 3. The depicted embodiment of seat 1 is configured with a seat mounting frame 5 for attachment to a vertical surface or wall located immediately behind the seat. The back 3 and seat portion 2 may be pivotally connected to frame 5, providing for the seat portion 2 to rotate up into a stowed position when not in use, or the back 3 to fold down for access behind the seat.

The belt restraint system shown in FIG. 1 is a four point system, comprising two shoulder belts 6 and two lap belts 4, all connectable together with a single latch over an occupant's lap. Multi-point belt restraint systems are typically either a four or five point systems. A five point system would include an additional belt extending from the front of the seat portion 12 between the occupant's legs, and up to the latch. In either system all the belts are typically released at once by operation of a single latch.

As best seen in FIG. 2, the shoulder belts 6 of exemplary seat 1 are attached to the seat frame behind the seat back 3 at anchor points 7. The anchor points may comprise a rigid bolted arrangement as shown, or alternatively a retractor mechanism that takes up slack and automatically locks under high accelerations. From the anchor points the belts extend upward passing first through guides such as D-rings 8, and then belt supports 9. The belt supports 9 comprise an elongated portion 11 disposed between a fixed end 12 attached to the seat back, and a free end 13 that guides the belt. In the depicted embodiment the belt support 9 attaches to the top of seat back 3 at belt support attachment points 10 via bolt holes 16, and incorporates a guide slot 15 in the free end. Shoulder belt 6 passes through guide slot 15 from behind to the front of the belt guide support 9. The elongated portion 11 of belt support 9 may be a plastic coated wire rope that extends around both ends of the belt support, cinched tight by oval compression sleeves 14. A durable, waterproof material such as plastic shrink tubing may be used as a cover for at least the elongated portion 11 and compression sleeves 14.

Figure 4:
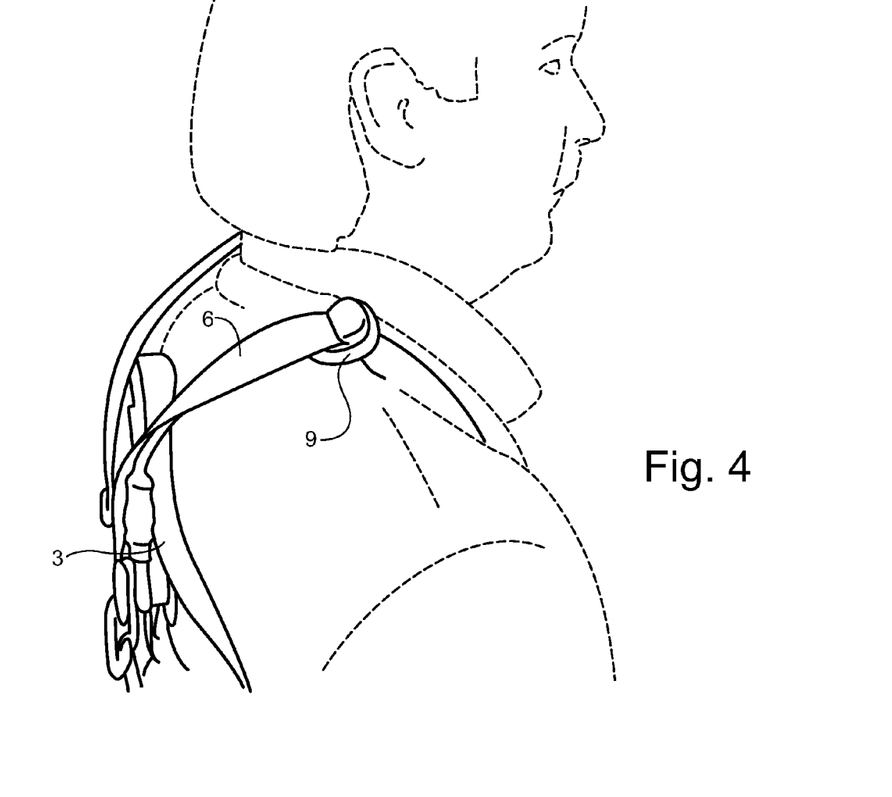
FIG. 4 shows an exemplary shoulder belt support and shoulder belt properly cinched down to the shoulder of a seated crew member.

The belt support of the present invention is designed to move between a raised orientation and a lowered orientation by varying tension in the shoulder belt. For example, the length and flexibility of the belt support 9 of the present embodiment is preferably selected such that it can be bent down until touching the top of an occupant's shoulders by the occupant pulling downward on the shoulder belt 6 with moderate tension, and then returned to its original orientation by simply releasing belt tension. FIG. 4 depicts a belt support 9 and shoulder belt 6 of the present embodiment pulled down onto the shoulder of a seated occupant. As shown, when the shoulder restraint is properly cinched down, the belt 6 is behind belt support 9, and the belt support 9 is trapped between belt 6 and the top of the occupant's shoulders.

Also illustrated in FIG. 4 is the mounting position of the belt support 9. In order for the shoulder belt portion of belt restraint system to effectively hold a crew member down in the seat under high acceleration conditions, particularly in a vertical direction, it is important to avoid gaps between the restraint and the occupant's shoulders. Such a gap inherently results when the guide or anchor point of a shoulder belt restraint is positioned above the shoulders of a seated occupant. While doing so can potentially make the belt easier to reach by the occupant, the result is a significant reduction in the degree of contribution by the shoulder belts to the vertical restraint afforded by the system.

In the present invention, the ability of the belt support to easily move to a lowered orientation by pulling on the shoulder strap effectively lowers the guide or anchor point to the height of the fixed end of the belt support. As depicted in the exemplary embodiment of FIG. 4, the top of the seat back 3 is below shoulder height of the seated crew member. Thus attaching the belt support to the top of the seat back also effectively locates the guide height of the belt below the top of the occupant's shoulders, ensuring against a gap between the belt and the occupant. In addition, the belt support of the present invention holds the shoulder belts up above the seat back when an occupant initially sits down and the belts are still relatively slack, placing them within easy reach. The length of the belt support can be tailored to ensure accessibility to all or a large percentage of occupants. Thus the belt support of the present invention significantly improves accessibility of the shoulder belts to a seated occupant without sacrificing any vertical restraint capacity of the belt system.

Figure 5:
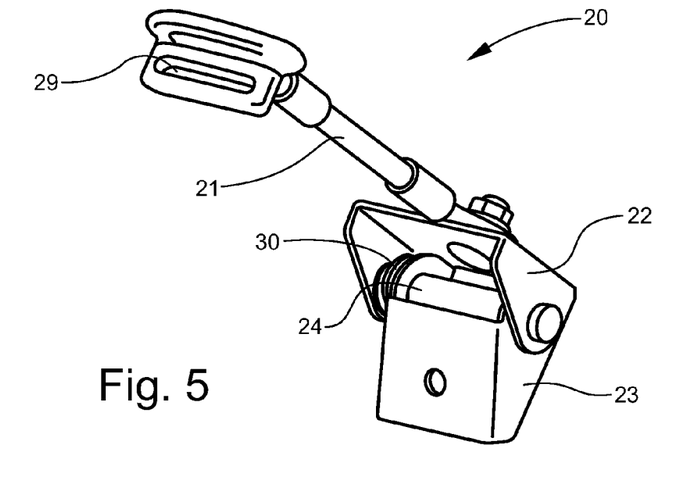
FIG. 5 is a perspective view of a pivoting shoulder belt support in accordance with the present invention.
Figure 6:
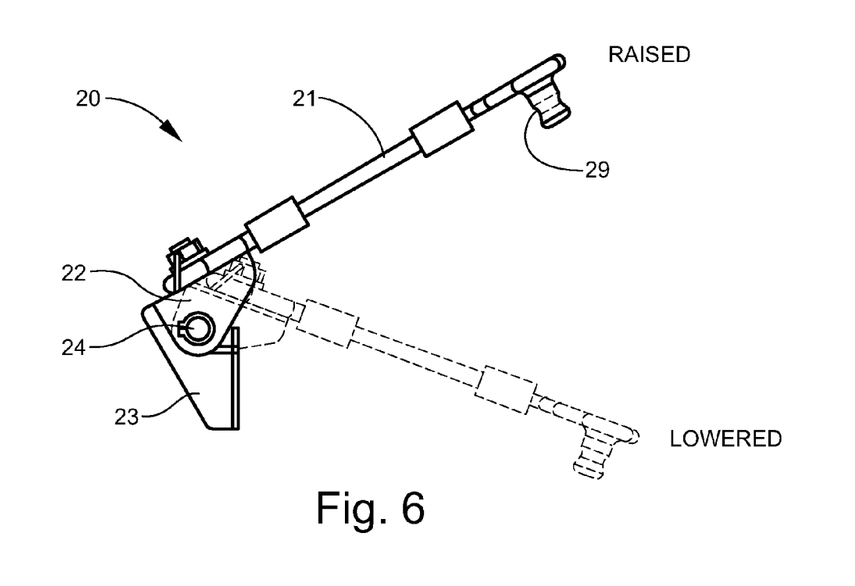
FIG. 6 is a side view of the pivoting shoulder belt support of FIG. 5 demonstrating movement between raised and lowered orientations.
Figure 7:
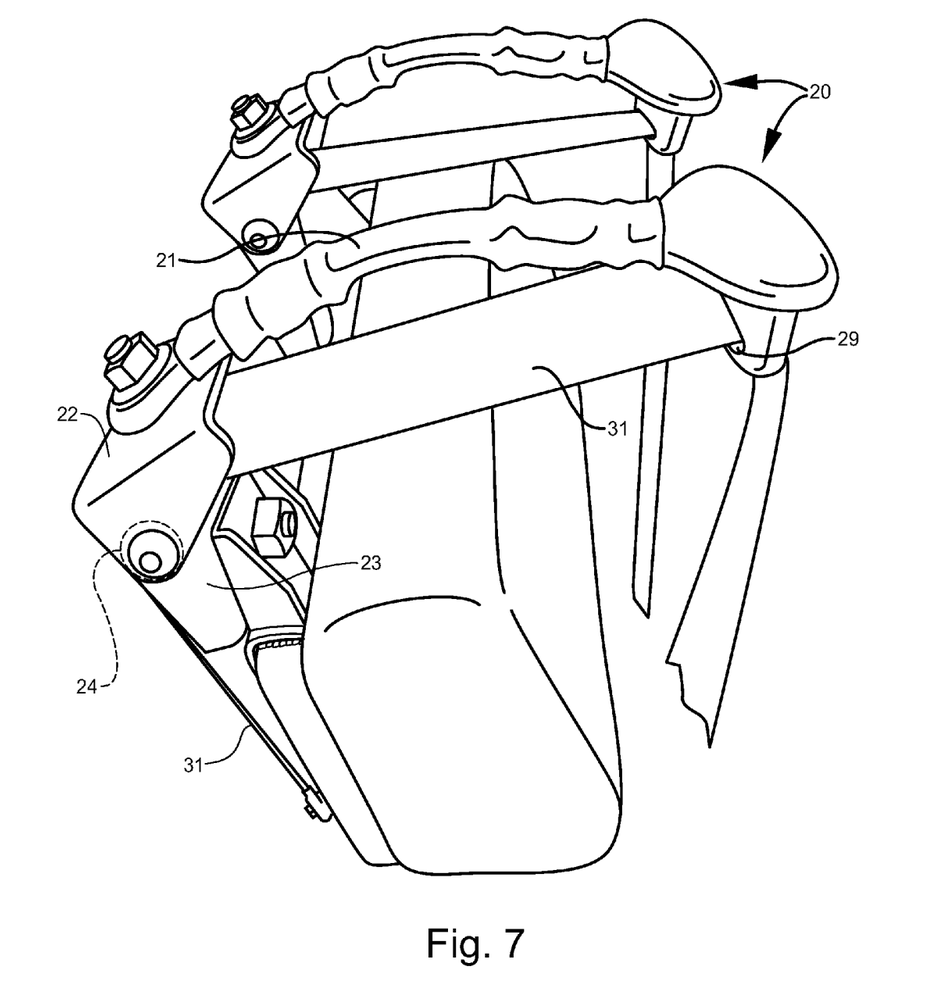
FIG. 7 is a perspective view of a crew seat illustrating the bending flexibility of the shoulder belt support.

FIGS. 5 through 7 illustrate another embodiment of the belt support of the present invention. The pivoting belt support 20 comprises generally a belt support 21, and a pivot mechanism comprising a pivot bracket 22, a mounting bracket 23, and a guide roller 24. The belt support 21 of the depicted embodiment is similar to belt support 9 of the previously described embodiment, having a fixed end, an elongated portion, and a free end. However it differs in that belt slot 29 is offset to the front side of the belt support, rather than in the same plane as is slot 15 of belt support 9. The fixed end of the belt support 21 is rigidly attached to the pivot bracket 22, which in turn is pivotally attached to the mounting bracket 23. Guide roller 24 is mounted inside bracket 23 along the pivot axis, and with a gap between itself and the inside of bracket 22 to provide room for the belt to slide. The guide roller 24 may be a bearing-supported bar or tube that easily rolls under the shoulder belt, or simply a smooth surface on which the belt slides.

As shown in FIG. 6, the belt support 21 is moveable between raised and lowered positions by pivoting of the pivot bracket 22 about mounting bracket 23. The brackets may be configured to allow unrestricted rotation of bracket 22, or to limit the upward or downward rotation. In one exemplary embodiment, post 21 is moveable between a raised position about 30 degrees above perpendicular to the seat back, and a lowered position about 20 degrees below perpendicular to the seat back. Maintaining a substantial angle between the seat back the belt support in the raised position as shown, as opposed to a vertical orientation in line with the seat back, has the beneficial effect of holding the shoulder belt away from the seat back. The gap thus created between the belt and the seat back facilitates ingress by allowing an occupant to slip behind the belt in the process of sitting down. A coil return spring 30 between brackets 22 and 23 biases bracket 22 and belt support 21 toward the raised position. The spring bias is preferably sufficient to hold the belt support in a raised position when the seat is unoccupied, yet compliant enough to allow the belt support to be readily pivoted down to an occupant's shoulders with moderate tension on the belt.

Figure 3:
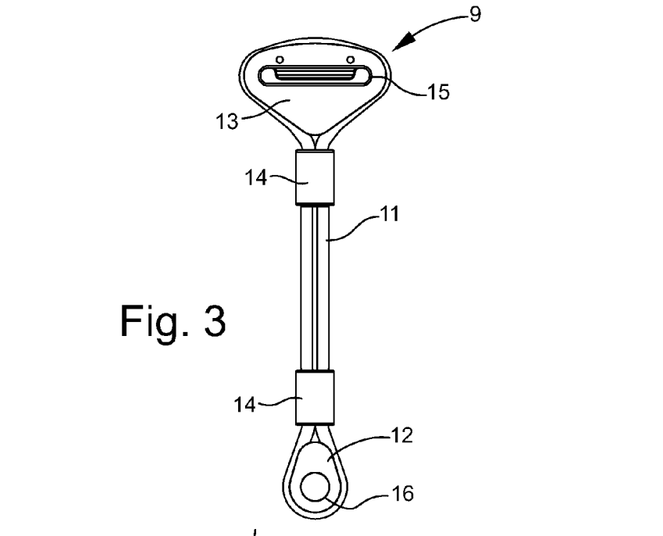
FIG. 3 is an exemplary shoulder belt support of the present invention.

It should be noted that in contrast to the embodiment of FIGS. 1-3 in which the belt 6 is behind the belt support 9, the pivoting belt support 20 of FIGS. 5-7 positions the belt between the belt support and the shoulder of the occupant. Referring particularly to FIG. 7, shoulder belt 31 extends upward from an anchor point behind the seat, (such as anchor points 7 of FIG. 2), over the guide roller 24, and through slot 29. Thus the belt is suspended between the guide roller 24 and belt slot 29, inside of belt support 21 relative to an occupant. Pulling downward on the shoulder strap applies a downward force to the end of belt support 21 via belt slot 29, causing the belt support to pivot downward toward an occupant's shoulders.

As previously explained, ensuring that the effective guide height of the shoulder belt is at or below shoulder level enables the shoulder belt to effectively constrain a seated occupant under high acceleration conditions. Accordingly the mounting bracket 23 and support roller 24 of the present embodiment are preferably located such that the roller 24 is below shoulder height of a typical seated occupant. In the exemplary embodiment of FIG. 7 for example, bracket 23 is attached to the top of the seat back frame, well below shoulder height. The lower end of belt support 21 attached to bracket 22 is also located below shoulder height of a typical seated occupant, although slightly higher than the top of roller 24 due to the gap between roller 24 and bracket 22. Consequently, some bending of belt support 21 may be necessary in order to bring the belt fully into conformal contact with the occupants shoulder and chest. To allow for that, the belt support 21 preferably has sufficient inherent flexibility to bend as shown without undue pulling force, and without taking a permanent set. For example, belt support 21 may be of the same flexible wire rope construction described previously with reference to belt support 9. Alternatively the elongated portion of belt support 21 (as well as the elongated portion 11 of belt support 9) may be made from a material with a high degree of shape memory, such as a strip of spring steel, or simply an elongated coil spring. Safety and comfort may be enhanced by covering at least the elongated portion of belt support 21 with a flexible sleeve, and further by incorporating a padding material such as foam rubber.

Figure 8:
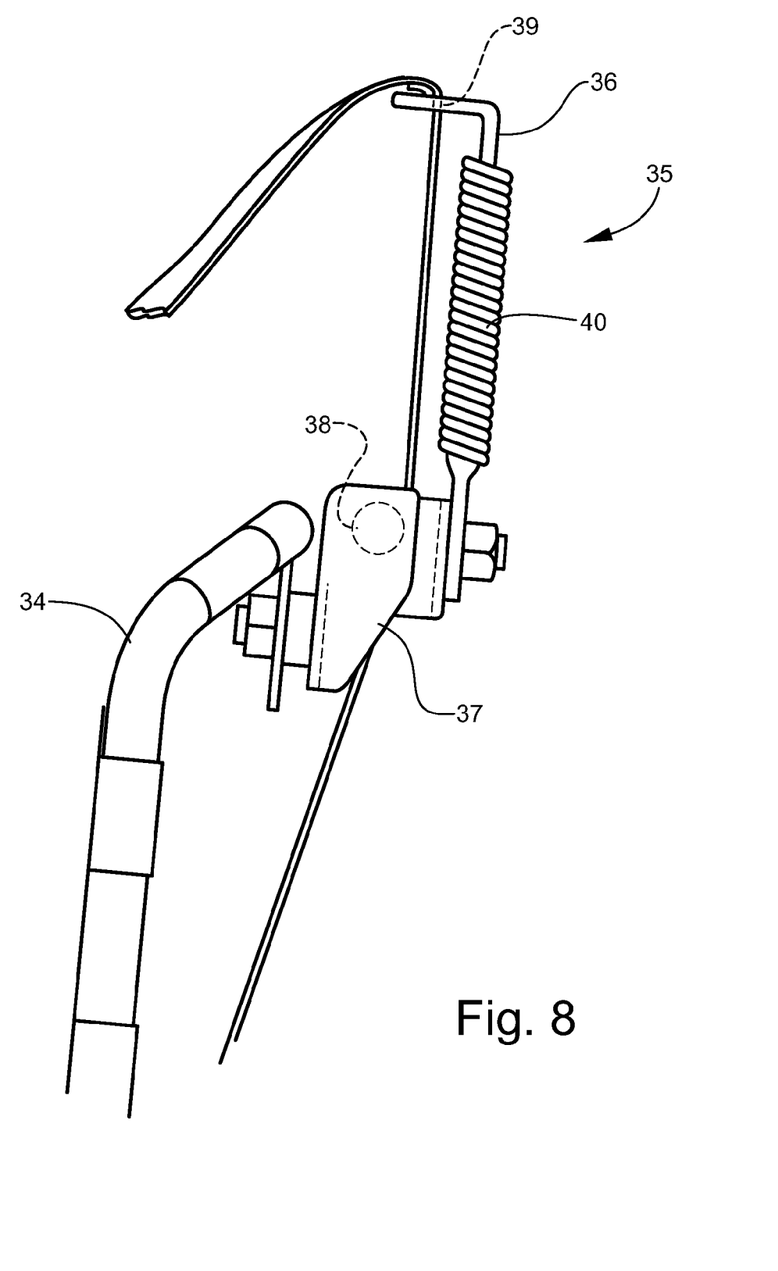
FIG. 8 is a side view of a hybrid embodiment of the belt support of the present invention.

FIG. 8 illustrates another embodiment of the belt support of the present invention that combines elements of both of the previously described embodiments. In particular, hybrid belt support 35 comprises a belt support 36 with fixed and free ends separated by an elongated center portion. The fixed end of belt support 36 is attached to a mounting bracket 37 configured for rigid attachment to a seat back frame 34. A belt roller 38 mounted inside bracket 37 is positioned to provide clearance for a belt to pass between the roller and the inside of the bracket. The free end of belt support 36 includes a belt slot 39 that is offset from the belt support similar to slot 29 of the belt support of FIGS. 5-7. The elongated portion of the belt support comprises a coil spring 40 for flexibility, although any other suitable elastic construction may be used, including the materials and constructions described previously in reference to belt supports 9 and 21.

Like the previously described embodiments, the hybrid belt support 35 of the present embodiment is biased toward a raised position in which the shoulder straps are held well above the seat back and easily accessible to a seated occupant. In the raised position the belt support 35 may be essentially vertical, and in line with the seat back as shown in FIG. 8, or alternatively, tilted forward at an angle to hold the belt away from the seat back as discussed previously in reference to the embodiment of FIGS. 5-7. Because the belt support 36 is rigidly attached to the seat via bracket 37, pulling the belt and belt support down toward an occupant's shoulders is accomplished primarily through bending of the coil spring 40, similar to the bending of the flexible wire embodiment of FIGS. 1-3. However, like the embodiment of FIGS. 5-7 the belt is positioned to the inside of belt support 36, between the guide roller 38 and belt slot 39. Thus when the restraint is pulled down to an occupant's shoulders, the belt is between belt support 36 and the occupant, improving occupant comfort. To ensure that the belt conforms to the occupant without a gap, mounting bracket 37 and roller 38 are again preferably at or below shoulder height of a typical seated occupant.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. For example, although the present invention has been discussed primarily as it relates to military camouflage, it should be appreciated that the embodiments and characteristics disclosed herein are equally applicable to hunting or any other endeavor where concealment and stealth are important and desired. Accordingly, all such modifications are intended to be included within the scope of this invention.

What is claimed is:

1. A crew seat for use in vehicles and aircraft potentially exposed to high acceleration or sudden impact conditions, comprising:
   a seat back with a rigid frame;
   a belt restraint system including a shoulder belt attached to an anchor point behind the seat back; and
   a shoulder belt support extending from the seat back, comprising an elongated portion disposed between a fixed end attached to the seat back and a free end with a guide slot, the shoulder belt support moveable between a raised orientation and a lowered orientation in response to a pulling force produced by a seated occupant cinching down and latching the shoulder belt, wherein the elongated portion of the shoulder belt support is flexible, and wherein the shoulder belt extends up from the anchor point, behind the elongated portion of the shoulder belt support, and through the guide slot to the front of the shoulder belt support.

2. The crew seat of claim 1, wherein the shoulder belt support further comprises a pivot mechanism at the fixed end that provides for at least some pivoting movement of the shoulder belt support between the raised and lowered orientations, and a return spring biasing the shoulder belt support toward the raised orientation.

3. A crew seat for use in vehicles and aircraft potentially exposed to high acceleration or sudden impact conditions, comprising:
   a seat back with a rigid frame;
   a belt restraint system including a shoulder belt attached to an anchor point behind the seat back;
   a shoulder belt support extending from the seat back, comprising an elongated portion disposed between a fixed end attached to the seat back and a free end with a guide slot, the shoulder belt support moveable between a raised orientation and a lowered orientation in response to a pulling force produced by a seated occupant cinching down and latching the shoulder belt;
   a pivot mechanism at the fixed end of the shoulder belt support that provides for at least some pivoting movement of the shoulder belt support between the raised and lowered orientations, the pivot mechanism comprising a mounting bracket rigidly attached to the seat back, a pivot bracket attached to the fixed end of the shoulder belt support and pivotally connected about a pivot axis to the mounting bracket, a guide roller positioned along the pivot axis with a gap between the guide roller and the pivot bracket, wherein the guide slot is offset to the front of the free end of the belt guide support; and
   a return spring biasing the shoulder belt support toward the raised orientation.

4. The crew seat of claim 3, wherein the shoulder belt support is pivotable between a raised orientation of about 30 degrees above horizontal and a lowered orientation of about 20 degrees below horizontal.

5. The crew seat of claim 3, wherein the shoulder belt extends upward from the anchor point, through the gap between the roller guide and the pivot bracket, in front of the elongated portion of the belt support guide, and through the guide slot.

6. The crew seat of claim 3, wherein the elongated portion of the seat belt support is flexible.

7. The crew seat of claim 3, wherein the shoulder belt is between the elongated portion of the shoulder belt support and the shoulder of a seated occupant.

8. The crew seat of claim 1, wherein the construction of the elongated portion is selected from the group comprising wire rope, spring steel, and a coil spring.

9. A belt restraint system for use on a crew seat suitable for vehicles and aircraft, comprising:
   a shoulder belt attached to an anchor point behind the crew seat; and
   a shoulder belt support extending from the crew seat, comprising a fixed end rigidly attached to the seat, a flexible elongated portion, and a free end with a guide slot; the shoulder belt support bendable between a raised orientation and a lowered orientation in response to a pulling force produced by a seated occupant cinching down and latching the shoulder belt, wherein the guide slot is above shoulder height of a typical seated occupant when the shoulder belt support is in the raised orientation, and wherein the shoulder belt extends up from the anchor point and behind the flexible elongated portion of the shoulder belt support before passing through the guide slot.

10. The belt restraint system of claim 9, further comprising a mounting bracket at the fixed end of the shoulder belt guide, and a roller guide inside the bracket with a gap between the roller guide and the mounting bracket larger than the thickness of the shoulder belt.

11. The belt restraint system of claim 9, wherein the fixed end of the shoulder belt support is attached to the seat below shoulder height of a typical seated crew member.

* * * * *